Jan. 5, 1960  B. F. MIESSNER  2,919,616
CLAMPING AND CONTROL APPARATUS FOR REED GENERATORS
USED IN ELECTRONIC MUSIC INSTRUMENTS
Filed Nov. 8, 1951  6 Sheets-Sheet 6
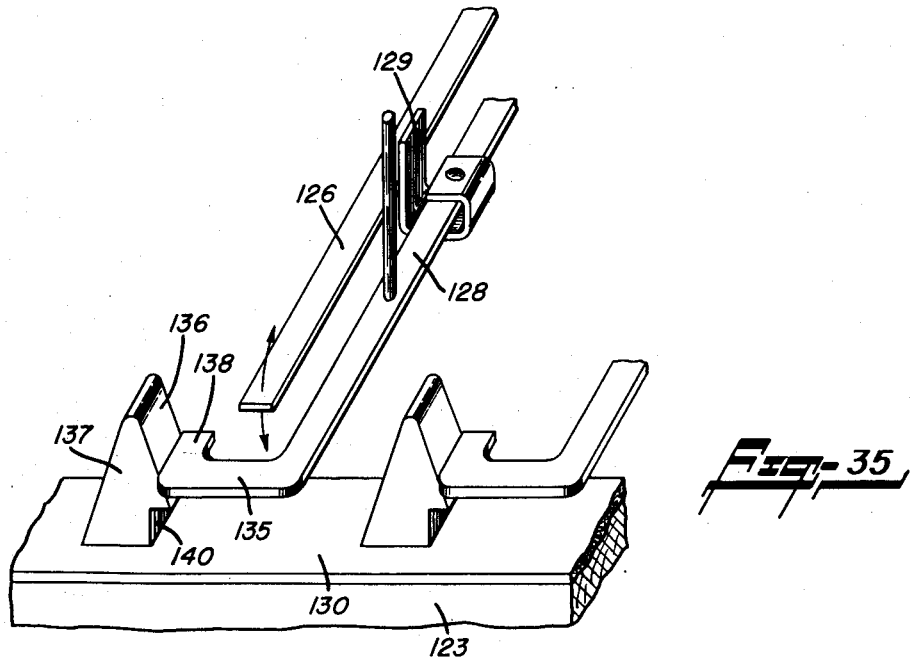
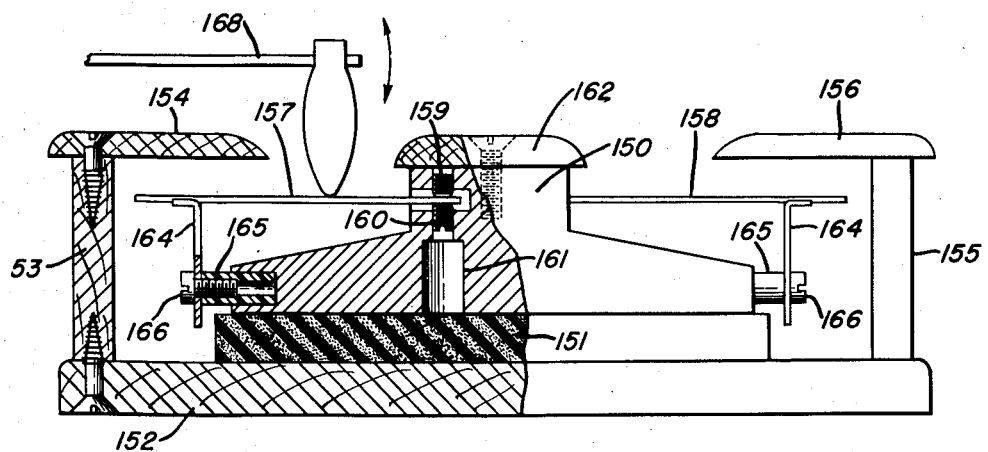
BENJAMIN F. MIESSNER
INVENTOR.

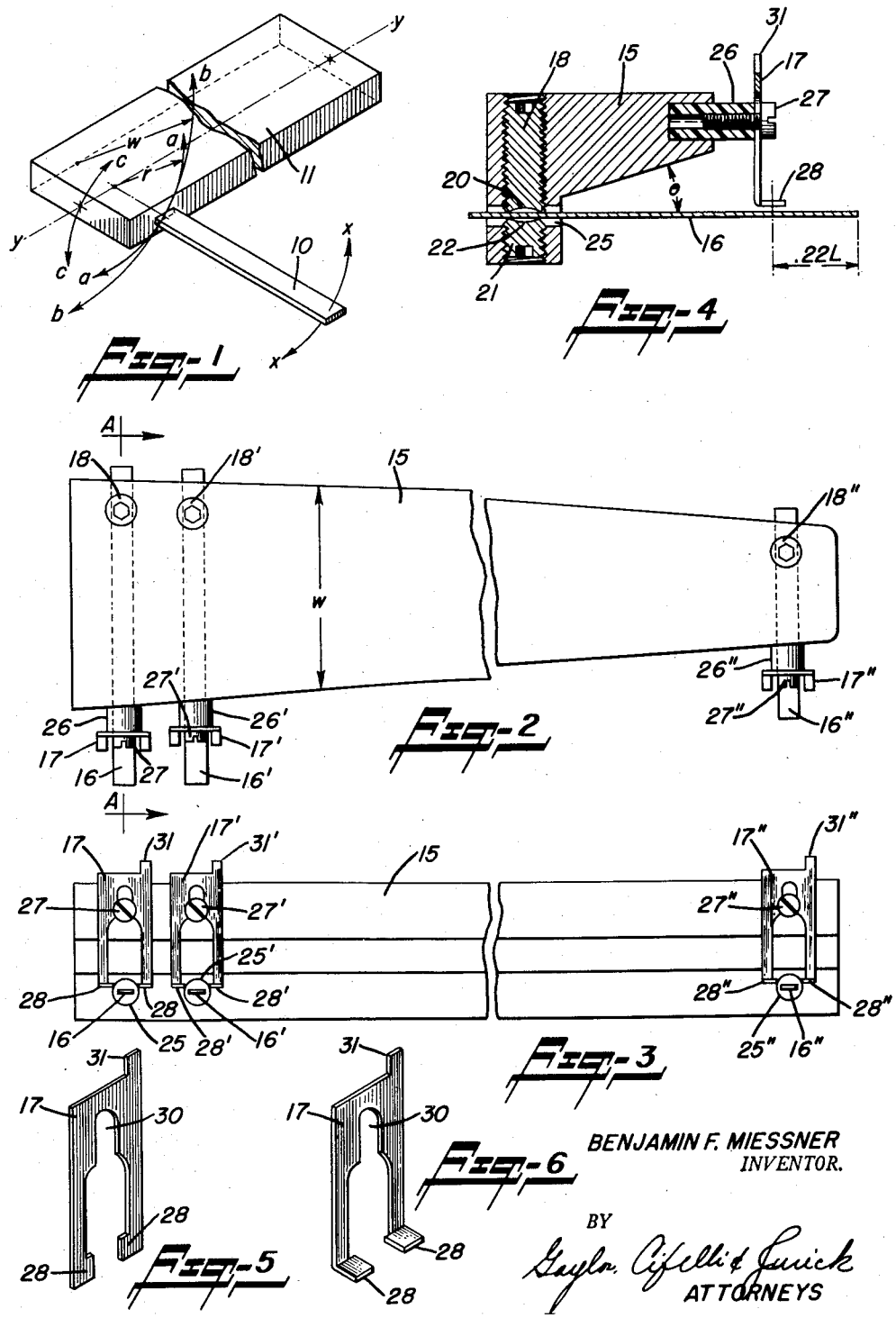

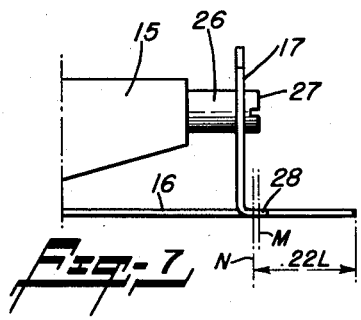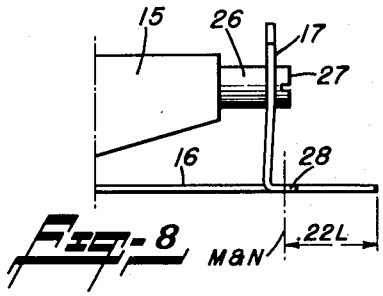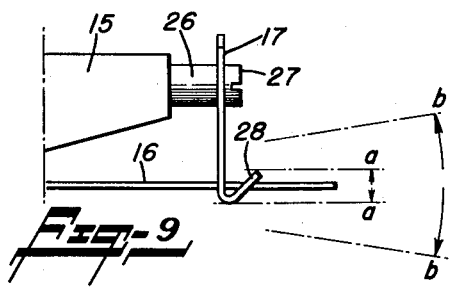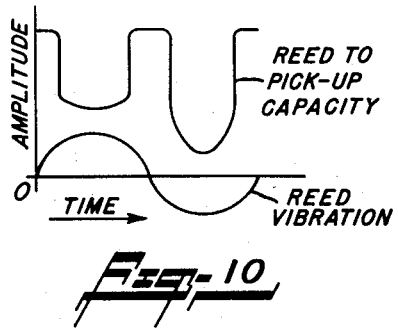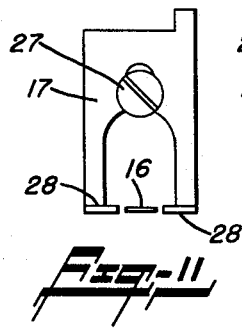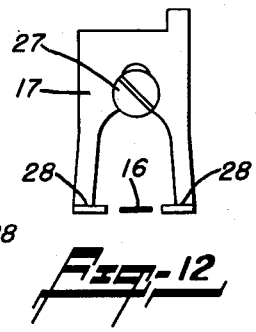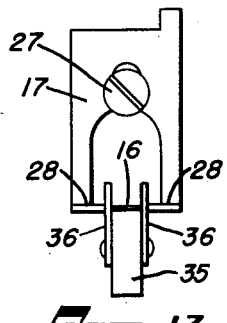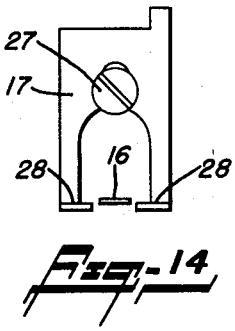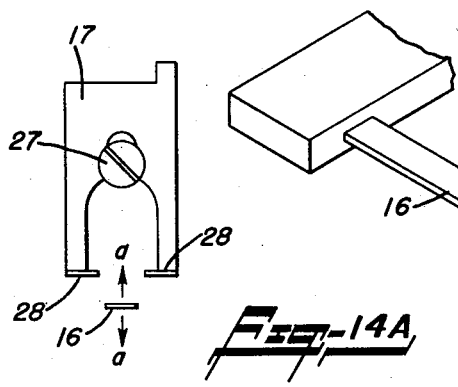

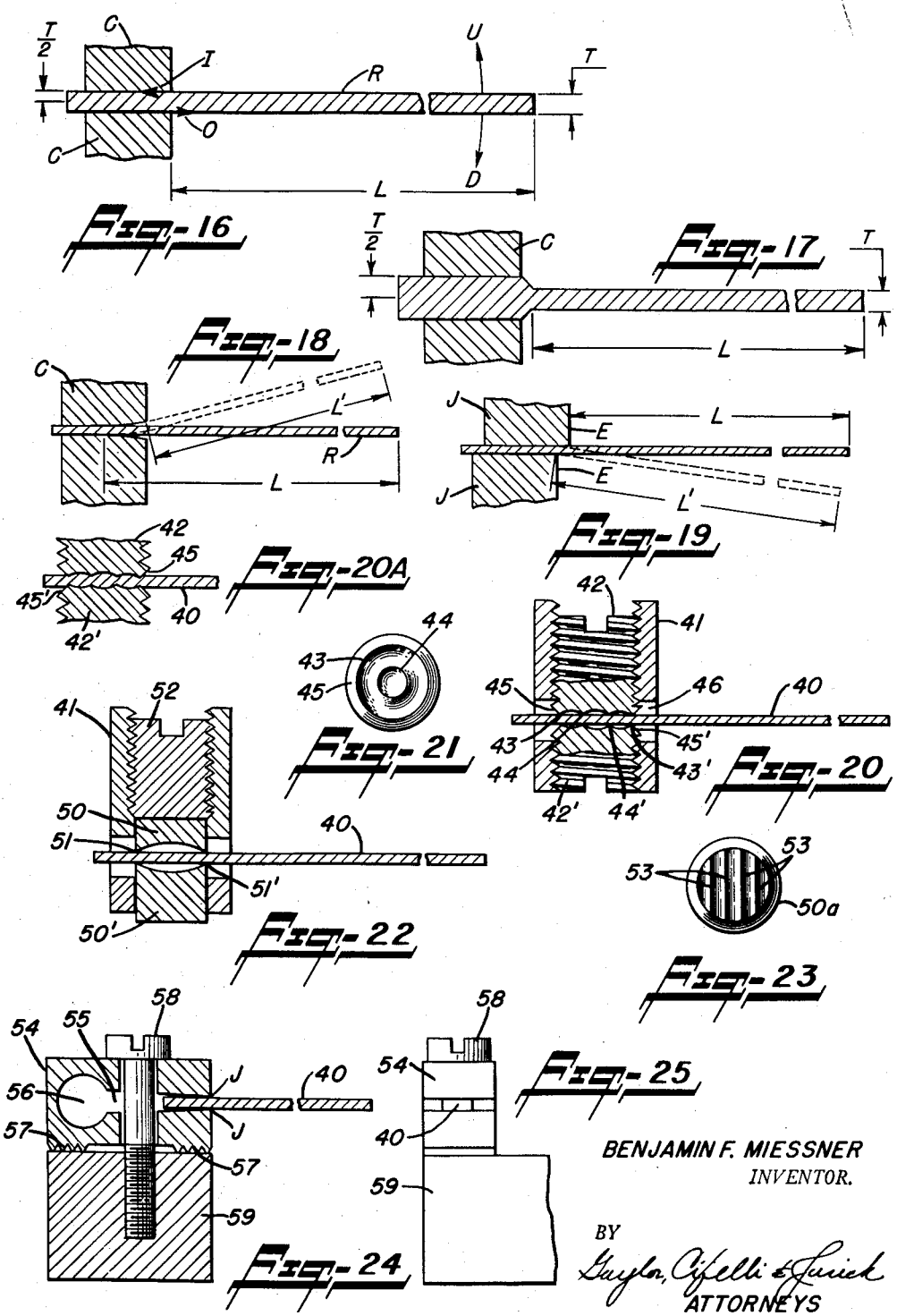

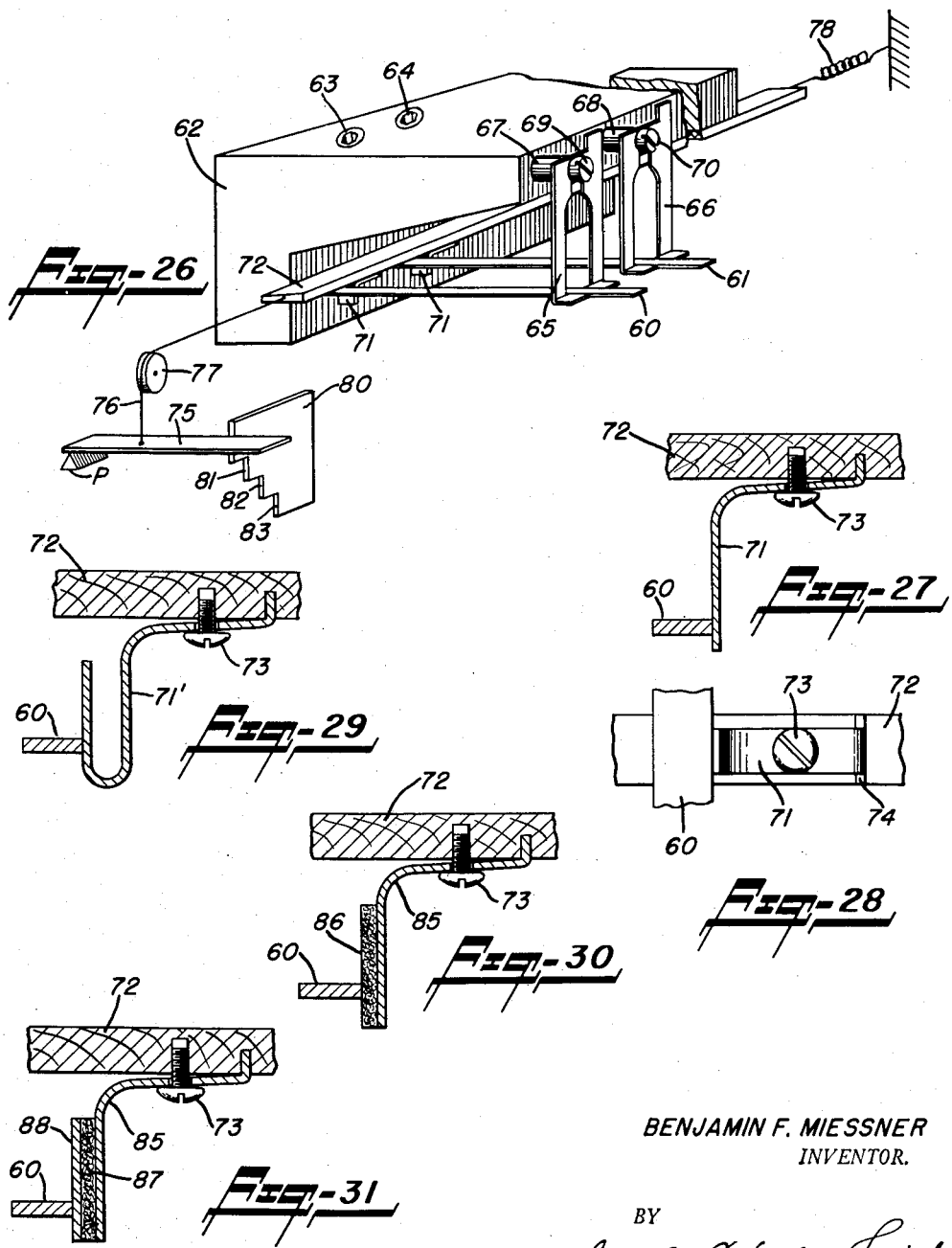

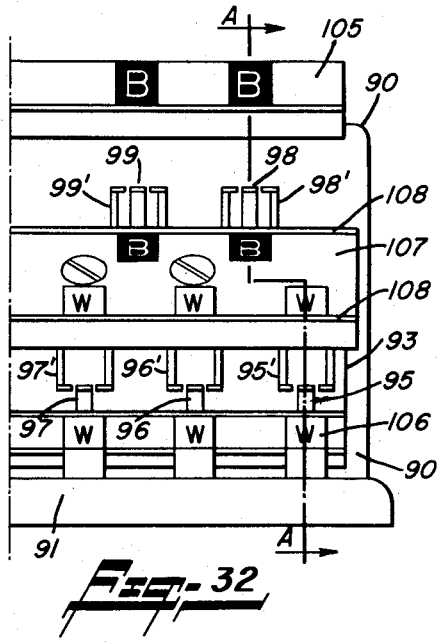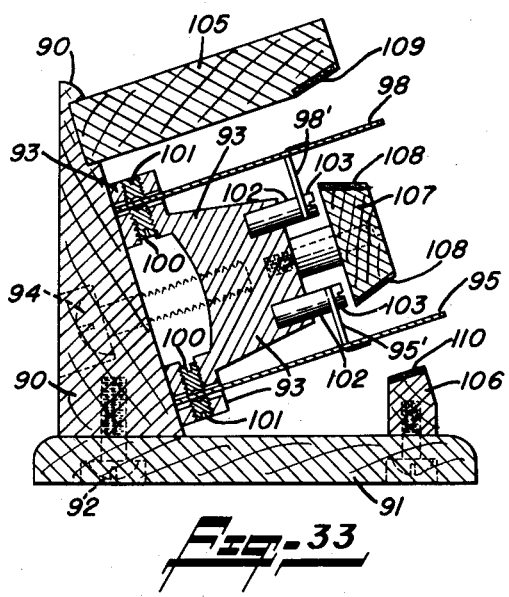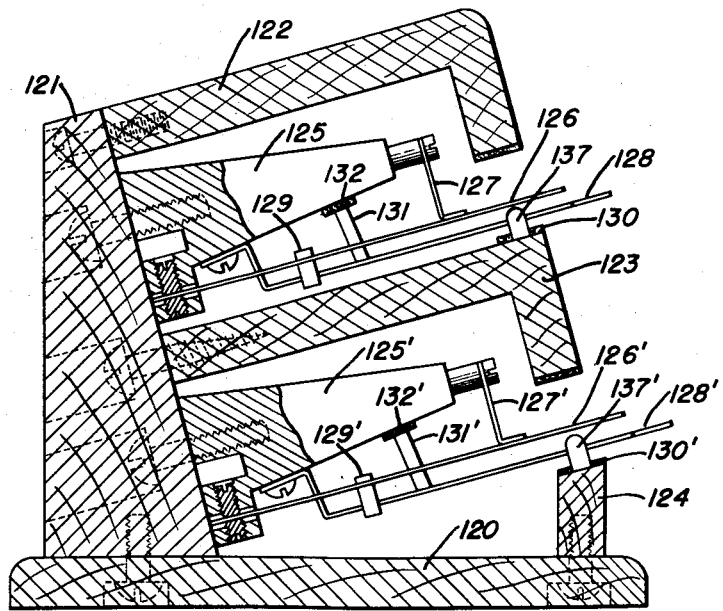

United States Patent Office 2,919,616
Patented Jan. 5, 1960

2,919,616

CLAMPING AND CONTROL APPARATUS FOR REED GENERATORS USED IN ELECTRONIC MUSIC INSTRUMENTS

Benjamin F. Miessner, Harding Township, Morris County, N.J., assignor, by mesne assignments, to The Wurlitzer Company, Chicago, Ill., a corporation of Ohio Application November 8, 1951, Serial No. 255,383

5 Claims. (Cl. 84—1.04)

This invention relates to percussive or other impulsively-excited vibrator instruments and more particularly to such instruments utilizing small beam type vibrators in combination with electronic translating apparatus for producing audible tones from such vibrators.

In electronic musical instruments, of the class contemplated by this invention, the beam type vibrators may be of the free-free, fixed-fixed, fixed-free or supported type. However, in the present invention, I prefer to use fixed-free type vibrators in the form of small reeds together with novel reed-clamping arrangements and novel translating devices whereby the instrument will produce tones characteristic of a conventional tensioned-string piano. Once having provided an arrangement for the production of piano tones, which have a low damping rate, I include novel means whereby the damping rate, or rates, of the tones can be altered at will to produce tones characteristic of other conventional instruments such as, for example, the harpsichord, harp, banjo, etc. The particular type of reed excitation means employed will depend, primarily, upon the character of the tones to be produced and although I prefer to use manually-operated or key-board-operated hammer strikers or direct finger-plucking, mechanical or electro-magnetic plucking or normally-deflected and release type of excitation means may be used.

While I may use various types of translating devices for the reed's mechanical vibration, such as, D.-C. polarized capacity pick-up, and associated A.F. amplifiers, electro-magnetic pick-up, photoelectric pick-up, or electro-dynamic A.F. or R.F. pick-up, I prefer to use capacitive types of pick-ups acting as amplitude and/or frequency modulators of a radio frequency oscillator with appropriate demodulating, audio frequency amplifying and electro-acoustic reproducing devices.

The principal object of this invention is the production of piano-like tones from fixed-free vibratory reeds while maintaining the conventional piano-like performance and playing technique.

Since the tone of a tensioned-string piano normally has a low damping rate, or long time decay, it is essential that an electronic piano include such characteristics if the tonal qualities are to be acceptable. To-date it has not been possible to duplicate such piano tone-damping characteristics when utilizing small vibratory reeds as the tone generators. This has been due, essentially to the fact that small vibratory reeds, with conventional mounting means, have a significantly higher damping rate than a tensioned string. While it is possible to utilize amplitude-controllable and phase-reversible, electrical feed back circuits of the regenerative or degenerative types for the control of the oscillation damping rates of vibratory reeds, I have found a simple way to decrease the normal damping rate of a small fixed-free reed whereby its vibration time equals or exceeds that of a tensioned string.

The musical tones of conventional instruments of the percussive or impulse excited class are differentiated chiefly by harmonic (or inharmonic) tone content, the damping rate of the tone as a whole, the damping rate of the individual partials of the tone, and, to some lesser extent, by the accompanying noise resulting from the particular manner of exciting the tone producer into vibration. In most instruments the noise resulting from the excitation means are non-musical and should be eliminated unless their traditional acceptance demands their inclusion.

In the present invention I provide any desired type of damped musical tone by an arrangement that includes suitable fixed-free vibrators, suitable impulse excitation means, suitable adjustable, and continuously-acting dampers for the vibrations of the vibrators and a suitable mechanico-electro-acoustic means for translating the vibrator vibrations into audible tones. By this I mean that the various components are of such construction and inter-related assembly that the desired type of damped musical tones are made possible by the control of the partial tone content of the individual vibratory reeds and by selective control of the reeds vibration damping rate.

The herein-disclosed invention is an improvement of the invention disclosed in my co-pending United States application Serial No. 169,714, filed June 22, 1950. These improvements consist chiefly in;

(1) The mounting support for the vibratory reeds and pick-ups;

(2) The clamping means for the individual reeds;

(3) The provision of individual, pre-set dampers for the individual reeds to normalize their damping rates;

(4) The provision of a unitary control for the selective regulation of the damping rates of all the reeds;

(5) The provision of novel, individual pick-ups and suitable adjustments to eliminate certain undesired modes of reed vibrations from the translating apparatus and to provide desired adjustments of tone quality and amplitude; and (6) The provision, where desired, of a reed mounting arrangement permitting excitation of individual reeds by finger plucking, or by hand-held mallet-type exciters.

A more specific object of this invention is the provision of a novel clamping arrangement for a fixed-free vibrator whereby the normal damping rate of the vibrator is decreased substantially.

Another object of this invention is the provision of a single support for both the vibratory reeds and the associated pick-ups designed to eliminate capacity changes in the reed-pick-up assembly except such changes as are due to actual reed vibrations.

Another object of this invention is the provision of a support for the vibratory reeds and associated pick-ups which support is of novel construction to minimize the absorption of energy from vibrating reeds.

Another object of this invention is the provision of a novel pick-up for translating vibrations of a reed.

Another object of this invention is the provision of a novel reed clamping arrangement whereby there is provided a definite sharp line of demarcation between the vibratory portion of the reed and its clamped end and whereby slippage between the reed and the clamp, upon reed vibration, effectively is eliminated.

An object of this invention is the provision of a mechanical damping arrangement for normalizing the individual damping rates of vibratory reeds and for selectively altering the damping rates of all reeds in unison.

The above and other objects and advantages of the invention will become apparent from the following description when taken with the accompanying drawings illustrating various embodiments of the invention. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is an isometric view of a reed secured to a reed base and intended to show the various different vibration modes of the base in response to normal vibration of the reed;

Figure 2 is a top view of my reed base with three vibratory reeds and their associated pick-ups secured thereto;

Figure 3 is a front view of the device shown in Figure 2;

Figure 4 is a cross-sectional view taken along the line A—A of Figure 2;

Figure 5 is an isometric view of the pick-up that is stamped from sheet stock;

Figure 6 is similar to Figure 5 and showing the opposed ends of the pick-up offset with respect to the body section;

Figures 7 to 9 are fragmentary side views showing various relationships between the side edges of the reed and the cooperating ends of the pick-up;

Figure 10 is a set of curves showing the character of capacity variations, with reed vibrations, for the pick-up arrangement shown in Figure 9;

Figures 11 and 12 are front views of a reed and pick-up and showing different spacings between the reed and pick-up ends to effect a change in translating efficiency;

Figure 13 is similar to Figure 11 and illustrates a means for proper alinement of the pick-up, with respect to the reed, by use of a suitable tool;

Figure 14 is similar to Figure 11 and showing the relationship between the reed and the pick-up for a minimum output tone damping rate;

Figure 14a is similar to Figure 14 but showing the relationship between the reed and pick-up for a maximum output tone-damping rate;

Figure 15 is an isometric view illustrating two vibration modes of a fixed-free reed;

Figures 16 to 19 are longitudinal, cross-sectional views showing various present types of reed-clamping arrangements and designed to show the shortcomings of such arrangements;

Figure 20 is an enlarged, longitudinal, cross-sectional view showing one form of my novel reed-clamping arrangement;

Figure 20a is a fragmentary, cross-sectional view similar to Figure 20 and showing the ridges of the clamping screws pressed into the reed;

Figure 21 is an end view of a reed-clamping screw of the type shown in Figure 20;

Figure 22 is similar to Figure 20 and showing another modification of the reed-clamping arrangement;

Figure 23 is an end view of a plug type reed-clamp modified to have a plurality of parallel, reed-engaging ridges;

Figure 24 is similar to Figures 20 and 22 and showing another embodiment of the reed-clamping arrangement;

Figure 25 is a front view of the assembly shown in Figure 24;

Figure 26 is a fragmentary, isometric view showing an assembly of reeds and pick-ups on a unitary base and including a more or less diagrammatic showing of mechanical vibration dampers associated with the reeds;

Figure 27 is an enlarged fragmentary, cross-sectional view taken longitudinally of the damper rail shown in Figure 26;

Figure 28 is a front view of the mechanism shown in Figure 27;

Figures 29 to 31 are similar to Figure 27 and showing other constructions of the individual reed dampers;

Figure 32 is a fragmentary front view of an electronic musical instrument made in accordance with another embodiment of my invention and wherein the reeds are arranged for finger plucking;

Figure 33 is a transverse, cross-sectional view taken along the line A—A of Figure 32;

Figure 34 is a transverse, cross-sectional view generally similar to Figure 33 but showing a modified assembly that includes selectively-operated, mechanical reed-vibration dampers;

Figure 35 is an enlarged, fragmentary, isometric view showing the relative construction and disposition of the reed-damper device associated with a reed 126 shown in the Figure 34 device; and Figure 36 is a side view, with the left half shown in transverse cross-section, of an instrument designed for mallet-excitation of the reeds, as in a conventional xylophone, marimba, etc.

When a vibratile reed is securely attached at right angles to the axis of a long support, the reed, when vibrating, tends to develop a like-frequency vibration in the support either by forced or resonant action. If the action is forced, the support's amplitude of vibration may be small, assuming the support to have a relatively large mass and stiffness. If the action is resonant, the vibration amplitude of the support will be relatively much larger. Since the energy for vibration of the support is supplied by the vibrating mechanically-coupled reed, the reed loses this energy with a resulting diminution of its own vibration amplitude. If the support be made of a viscous or visco-elastic material having a large coefficient of internal viscosity at the reed vibration frequency and if the coupling between the reed and its support be large, the support will draw energy from the reed at a rapid rate especially if the energy transfer is a resonant action. The first requirement, therefore, for minimizing the reed energy losses due to the support is to make that support of a material having a low coefficient of vibrational viscosity. Such materials are cast bell alloys, (such as 13 parts copper and 4 parts tin) glass, porcelain, high carbon steel of about Rockwell C–50 hardness, hard grades of cast brass, bronze or aluminum.

Additionally, the form of the support, or supports, carrying the reeds and the associated pick-ups should for certain types of output tone, be such that there be no change in capacity between the reed and the pick-up except that due to reed vibrations. Therefore, the support must be stiff and non-vibratile. In the case of an electronic piano the number of reeds and pick-ups may number 70–88. Should these pick-ups vibrate, with respect to the reeds at a given small amplitude and in phase with each other, the translated output vibration would be 70–88 times that of a single reed vibrating at the same amplitude. This pick-up support vibration could therefore, produce a very powerful foreign and undesirable frequency component in the output tone of the instrument. To eliminate, or reduce as far as possible, such undesirable capacity variations between the reeds and the pick-ups I prefer to mount the reeds and pick-ups on a common, massive and stiff support which itself is designed to absorb a minimum amount of energy from the vibrating reeds.

In order to explain the various modes of vibration imparted to a support by a vibrating reed we will assume, for purposes of analysis, a long, more or less rectangular bar resting on an elastic base of low viscosity material such as a thick foam rubber pad. Reference is made to Figure 1 showing a vibratory reed 10 having one end firmly secured to such relatively long bar 11. Normally, the reed is excited in such manner that it vibrates in a plane perpendicular to the axis of the support and as indicated by the arrows X—X. In a straight, fixed-free reed, of uniform section, so vibrated, the frequency relationship between the fundamental vibration (partial I) and the other inherent vibration partials is as follows.

| Partial | I | II | III | IV | V | VI | VII | VIII |
|---|---|---|---|---|---|---|---|---|
| Frequency Ratio | 1 | 6.27 | 17.55 | 34.4 | 56.9 | 85 | 118.5 | 157.2 |

At each of the above frequencies the reed develops several types of forces in the bar 11, said forces tending to vibrate the bar at these same frequencies. These various vibration modes of the bar are discussed separately, below:

(a) *Torsional vibration mode.*—The vibrations of the reed tend to vibrate the bar about the latters longitudinal axis Y—Y. If the reed be located at one end of the bar, as shown, that portion of the bar to the right of the reed tends to remain at rest due to its own rotational moment of inertia. However, that portion of the bar adjacent to the reed tends to twist about the arc $a$—$a$ having a radius $r$. Now, if any one of the bar's own torsional vibration frequencies is equal to any of the reeds vibration partials, the bar's torsional vibration frequency will be relatively large assuming that the vibrational Q of the bar is high.

(b) *Lateral vibration mode.*—As the reed vibrates up and down it tends to lift the reed-attached side (front end) of the bar so that the bar tends to vibrate along the arc $b$—$b$ having a radius W. If the rear edge of the bar is anchored to some other massive support the frequency of this particular vibration mode will be proportional to the bars thickness and inversely proportional to the square of the bars width. Obviously, this mode of vibration will have very much higher vibration frequencies that the torsional vibration mode.

(c) *Longitudinal vibration mode.*—As the reed vibrates up and down it also tends to lift and depress the reed-supporting side of the bar so as to deform the bar's axis. This sets up a longitudinal vibration of the bar and about its partial frequency nodal points as indicated by the arc $c$—$c$. This mode of bar vibration, like that of the torsional mode, is also obviously of much lower frequency than the lateral mode.

The only complete solution to the problem of eliminating the above described vibrations of the reed-supporting member, and the resulting withdrawal of energy from the reed, is to make the supporting member so massive that the coupling of the reed to the support is insignificantly low, and so stiff that the lowest partial frequency of its three vibration modes is well above that of the highest partial frequency of the highest pitched, attached reed. While only the fundamental vibration frequency of each reed is desired for tonal output use in my piano, it must be remembered that higher vibration partials of the reed can cause increased damping of the fundamental component by resonant losses in the reed support.

Since a sufficiently massive reed support, to meet these ideal conditions, is impractically large and heavy, the compromise solution lies in making the reed forces, acting on the support (of practical size), as small as possible, other factors being equal. With given reed and base sizes, the reed to base coupling can be lowered either by making the base stiffer and more massive or by reducing the size of the reed so that its vibratory forces which tend to deform the base are materially reduced. Since the stiffness of a cantilever beam is proportional to the square of its thickness, the base-deforming vibratory forces of the reed can be reduced to ¼ by halving the reed thickness. By experiment, and with due consideration given to other factors involved such as the reed's own self-damping rate and dimensional factors affecting translation of the reed vibrations, I have found the ideal reed thickness to be 0.025 to 0.035 inch, for piano tone production.

The lateral vibration mode of the reed-supporting base can be removed, conveniently, by making the width and thickness of the support sufficiently short and large, respectively, so that the frequency of vibration is higher than the highest pitched reed, namely 4,092 cycles per second. Such support, or base, for the reeds and the pick-ups will now be described.

Reference is now made to Figures 2 and 3 which are a top and front view, respectively, of my reed base 15 carrying the vibratory reeds 16, 16' and 16" and the pick-ups 17, 17', 17", associated with each reed. It will be understood the reed base 15 carries the full complement of tuned reeds and pick-ups which, in the case of a piano, may number 88. The reed base is made in one solid piece, preferably a metal casting, as cast metals have a microstructure having an inherently low vibration viscosity. By so making the reed base in a single casting, the structure is not subject to relative vibrations of the type possible in a multi-member support such as, for example, an assembly comprising a separate reed rail, a pick-up rail and an interconnecting plate. The reeds are individually clamped in position by large-diameter, fine thread, socket-head set screws 18, 18', 18" having a novel reed-clamping end as shown in Figure 4. The end of the screw 18 is concave resulting in a small circumferential ridge 20 that engages the upper surface of the reed 16. A similar screw 21, has its ridge 22 axially alined with the ridge 20 of the screw 18, and engages the opposite surface of the reed. It may here be stated the circumferential ridges in the clamping screws are very small in height, in the order of 1 mil. Since the set screws are made of hardened steel such ridges "bite" into the reed surface thereby defining a very sharp, positive reed termination having certain outstanding advantages as will be explained in more detail with reference to Figures 20–22. As shown in Figures 3 and 4, the reed base 15 is provided with a series of transverse holes 25, 25', 25" having diameters larger than the width of the reed passing therethrough. These holes serve two purposes, namely, as a clearance area to permit unimpeded vibration of the reed and to permit a firm clamping of the reed solely by the opposed set screws to maintain a sharply-defined reed-termination point.

The reed base 15 has a progressively-varying width, indicated by the letter W in Figure 2, said width being a maximum at the base or low-frequency reed end and a minimum at the treble or high-frequency reed end. In actual practice the width of the base at any point is approximately 75% of the axial length of the proximate reed, as will later be explained. The spacing of the reed base from the reed and the angle $\theta$ are such as to permit free and unrestricted reed vibration at its maximum desired amplitude.

The front face of the base is square with the top surface and approximately ½ inch thick. A series of holes is bored into the front face of the base such holes being parallel to the reeds and directly above them. The tubular bushings 26, 26', 26" are force fitted or otherwise attached into these holes said bushings being made of an insulating material, such as a plastic, and each bushing has an internally-threaded section to accommodate the screws 27, 27', 27" by which the conductive pick-ups 17, 17', 17" are secured in proper position such that the associated reeds may vibrate freely between the opposed pick-up ends 28, 28', 28".

As shown in Figure 5, the individual pick-up 17 is punched from a sheet of suitable metal having a thickness such that the pick-up is non-vibratile per se. I have found soft brass suitable for this purpose. As shown in Figure 6, the ends 28 of the pick-up are bent at a right angle to the body section so that when the pick-up is secured in position on the reed base these ends will be in a plane substantially parallel to that of the associated reed, as shown in Figure 4. These ends straddle the associated reed forming a dual capacity pick-up and the transverse center line of the pick-up ends 28 is made to coincide with the nodal point of the reeds vibration partial II. Such nodal point is located approximately 0.22L from the reed's free end (L being the effective axial length of the reed's vibratory portion) as is well known in this art and as is indicated in Figure 4. With the pick-up so positioned, vibration partial II of the reed is not translated into a capacity change between the reed and the pick-up and, therefore, such vibration partial is eliminated from the output tone of the instrument. The longitudinal notch 30 in the body of the pick-up permits adjustment of the pick-up up and down with respect to the reed. Such adjustment controls the relative effect of the reeds fundamental and partial vibrations in the output tone. If the ends 28 of the pick-up are positioned in a plane high above or below that of the reed when the reed is in the at rest position, essentially only the fundamental vibration appears in the output tone at reed vibration amplitudes not exceeding the normal transverse spacing between the reed and the pickup ends. If the ends 28 of the pick-up are directly opposite the reed edges, that is, in the plane of the reed, the reed vibrations will be translated at double the frequency and the fundamental will disappear. In the latter case, the reed flies by the pick-up ends at maximum velocity in its cycle of vibration so that the capacity peaks are highest and steepest generating, for maximum reed amplitude, the strongest complement of integrally-related partial tone vibrations.

Inasmuch as the individual pick-ups are insulated from each other and the reed base, the pick-ups may be provided with integral extensions 31 serving as terminals by which all pick-ups can be connected together, as by a wire. Alternatively, a metallic plate extending the full length of reed base, and provided with holes alined with the threaded holes in each of the pick-up-supporting bushings, can be disposed in front or in back of all pick-ups and secured in position by the pick-up fastening screws.

In the assembly shown in Figure 4, the plane of the outer end of the bushing 26 can be established with a high degree of precision such that when the pick-up 17 is secured thereto, by the fastening screw 27, the ends 28 of the pick-up will straddle the reed at the point representing the nodal point of the reeds partial II. In the event further adjustments of the pick-up are necessary to align the pick-up ends with such nodal point this can be done by making the length of the bushing 26 somewhat shorter than required and then interposing a washer of suitable thickness between the bushing end and the pick-up. As a practical matter, the simple assembly illustrated in Figure 4 is quite satisfactory for establishing the pick-up ends in proper position with respect to the nodal point of reed vibration partial II and further, critical adjustments can be made by bending the pick-up as will now be described with reference to Figures 7 and 8.

Figures 7 and 8 are fragmentary side views similar to the cross-sectional view of Figure 4. In Figure 7 the pick-up 17 is shown extending straight down from the supporting bushing 26 with the pick-up ends 28 lying in the plane of the reed 16 when the latter is at rest. The precise nodal point for partial II of the reed is indicated by the line N positioned a distance 0.22L from the free end of the reed. It will be noted that the line N is displaced from the transverse center line of the pick-up ends 28, the latter being indicated by the line M. To establish an exact alinement of the lines M and N the body of the pick-up can be bent toward the fixed end of the reed as illustrated on an exaggerated scale in Figure 8. In such case the pick-up ends 28 are bent upward slightly so that they again lie in the plane of the reed, as shown.

As has been stated above, a maximum, sharply peaked change in capacity between the reed and the pick-up occurs when the parallel ends of the pick-up lie in the plane of the reed when the latter is in the at rest position. However, my novel pick-up construction affords a simple means for altering the character of the capacity changes upon reed vibration. For example, the ends 28 of the pick-up can be bent out of parallelism with the reed surface as shown in Figure 9. In such arrangement the time during which the reed is adjacent to the pick-up ends is increased, and the maximum capacity between the reed and pick-up is decreased. However, the time during which the capacity remains constant within one cycle of reed vibration is increased to a significantly larger value resulting in a substantially flat-topped capacity variation curve as shown in Figure 10. Such capacity curve results in a change of tone quality and it will be apparent that other tonal qualities can be obtained by other adjustments of one or both pick-up ends relative to the reed. Furthermore, since reed vibration amplitudes which are within the confines of the adjacent pick-up arms 28, produces no variation of reed to pick-up capacity, this capacity will be modulated only when the reed vibration amplitude exceeds these confines as indicated by the arrows $a$—$a$. Thus a strongly excited reed, with maximum amplitude as indicated by the arrows $b$—$b$, will be translated only until its amplitude falls slightly below amplitude $a$—$a$, and this results in an increase of output tone damping rate. This applies of course only when the lower and upper ends of the pick-ups are equidistant from the reed in its at rest position. If, for example, the pick-up is raised so that its lower (bent) edge is in the plane of the top surface of the reed, then minimum damping of the output tone may be secured but with retention of the tone qualiy changes produced by the bent arms.

The translation efficiency of my pick-up is also adjustable by merely bending the pick-up ends closer together or further apart as shown in Figures 11 and 12 which are front views of the pick-up and reed. In Figure 11, the spacing between the reed 16 and the ends 28 of the pick-up is relatively small whereas the similar spacing in Figure 12 is relatively large. Both illustrations are drawn to an exaggerated scale for purposes of illustration as the spacing between the inwardly-facing ends of the pick-up is, normally, about 0.005 inch greater than the width of the associated reed, thereby providing a normal clearance gap of about 0.0025 inch on either side of the reed. While the spacing between the pick-up ends can be established, in the first instance, during the punching operation by which the pick-ups are made, a precise spacing can be set by bending the legs of the pick-ups inwardly or outwardly in conjunction with a suitable gauge. Once the spacing between the pick-up ends is set the pick-up can be adjusted angularly about its fastening screw to equalize the two clearance, or air, gaps between the reed and the adjacent pick-up ends. A suitable tool may be employed for this operation. As shown in Figure 13, the tool comprises a solid, rectangular rod section 35 having a pair of flat air gap spacer 36 secured thereto to form a fork. Each of the spacers has a thickness corresponding to the clearance to be established between the sides of the reed 16 and the ends 28 of the pick-up 17. These spacer members are inserted into the clearance gaps, as shown, after which the pick-up clamping screw 27 is tightened. Several such tools may be used each having parallel spacer members of a given thickness, such as .002", .0025", .003" etc., to provide different pick-up sensitivities.

The damping of the output tone of the reed may also be controlled by the vertical positioning of the pick-ups relative to the associated reeds. The lowest such damping rate prevails when there is a small amount of overlap between the adjacent faces of the reed and pick-up ends as shown in Figure 14. Here the slightest residual tremor of reed vibration causes a variable-area type of change in the capacity between the reed and the pick-up. The highest tone damping rate prevails when the ends of the pick-up are positioned relatively far below or above the reed, the latter arrangement being illustrated in Figure 14–a, where the length of the arrows a, a, indicate the maximum amplitude of reed vibration.

The individual reeds of the instrument can be set into vibration in numerous ways. If we assume, for the present, that the reeds are to be impulsively-actuated, as when struck by a hammer, I have found that the reed should be struck at a point 0.25L to 0.35L from its fixed end (L, being the length of the vibratory section of the reed) by a moderately soft hammer. The .35L point is the nodal point for vibration partial IV and the .25L point is the nodal point for partial V. Thus, if a reed be struck precisely at one such point the corresponding vibration partial of the reed is not excited and, therefore, does not appear in the output tone of the instrument. However, if a relatively soft hammer is used and such hammer has a width, along the reed axis, which spans over two or more vibration partial nodal points, the partials having such spanned nodal points will be only weakly excited. Additionally such hammer damps out such partials to a much greater extent than lower numbered partials. For example, if the reed has the following partial frequencies and the hammer contact time with the reed is 0.1 second, the number of vibration cycles during which damping occurs due to hammer contact is as shown.

| Partial No. | I | II | III | IV | V |
|---|---|---|---|---|---|
| Partial Frequency | 100 | 627 | 1,755 | 3,440 | 5,690 |
| Vibration Cycles During Hammer Contact Time | 10 | 62.7 | 175.5 | 134.4 | 569 |

Obviously, since the hammer acts as a damper during its reed-contact time, it will extract, from the reed, a minute amount of energy during each cycle of its vibration and the total amount of such energy extracted will increase in proportion to the total number of such vibrations. If, therefore, a given small amount of damping effect for vibration partial I is represented by the damping factor $$\frac{100}{10}=10$$

then vibration partial II, which executes 6.27 times the number of oscillations of partial I, will be damped 6.27 times more than partial I. Partial III will experience 17.55 times the damping effect of partial I, partial IV, 34.4 times that of partial I, partial V, 56.9 times that of partial I, etc. These values assume that the hammer contacts the reed at equally-effective positions with respect to the individual nodal points for the concerned partials. In addition to the above, the specific initial vibration amplitudes of the individual vibration partials vary as their frequency so that the higher numbered partials drop out much faster than the lower. The point which I wish to stress here is that a proper choice of the hammer material and selection of its reed-contact point will, effectively eliminate, or render unimportant, the higher numbered partials of the reed with respect to the output tones of the instrument. A more detailed discussion of a preferred hammer for impulsive excitation of the tuned reeds is found in my copending United States patent application Serial No. 248,947, filed September 29, 1951.

Vibration partial II of the reed, however, is the worst offender as to raggedness of initial tone quality because, if the pick-up be located at the reed tip this partial has an amplitude of the order of ⅛ that of partial I and is only 6.27 times higher in frequency. If the electronic circuit employed to translate reed vibrations into audible tones is of the type disclosed in my copending application Serial No. 169,714 wherein such circuit develops a full series of integrally-related Fourier series partials, the partial II of the reed having a relative frequency of 6.27 will conflict with the sixth partial of the Fourier series having a relative frequency of 6.0 to produce a transient dissonance. The advantage of positioning the pick-up at the nodal point for vibration partial II of the reed to thereby eliminate the partial II completely from the output tone is, therefore, quite apparent. In fact, such specific positioning of the pick-up permits the use of small reeds whose second partial II is not retuned from normal dissonance to harmony with partial I as, for example, by the damper-tuner arrangement shown in my copending application Serial No. 169,714. Specifically, the normal ratio of the vibration frequencies of partial II to partial I of a clamped-free reed is 6.27, obviously a dissonant relationship, whereas the damper-tuners adjust the vibration frequencies ratio of these partials to 6, or some other integral ratio such as 5 or 4. In addition, the positioning of the pick-up at the nodal point for the reed's vibration partial II, as herein disclosed, also permits the use of hard, sharp hammers for excitation of the reed. Such hammer excitation of the reed generates a partial II vibration of normally high amplitude and provides little or no selective damping among the various reed vibration partials. Since my pick-ups do not translate partial II vibrations such dissonant partial does not appear in the pick-up translated output tone of the instrument. Minimizing of the relative amplitude of partial II is however preferable (as by soft hammers, etc.), in conjunction with the partial II nodal point pick-up, to insure total absence of partial II from the output tone.

Reference is now made to Figure 15 with respect to the following discussion describing another advantage of my novel pick-up construction. When the reed 16 is struck normal to its flat side it will vibrate predominantly in the plane indicated by the arrows a—a, generally referred to as the A vibration mode. If, however, the reed be struck at an angle other than normal to its flat side the reed will also vibrate in the direction of the arrows b, b, generally referred to as the B vibration mode. These two vibration modes are perpendicular to each other and the partial frequencies of one mode will not be consonant with those of the other mode unless the width dimension of the reed be very exactly predetermined in relation to its thickness. For example, if the reed has a width exactly twice its thickness the vibration partials of the B mode will be exactly two (2) times the frequency of the corresponding partials of the A mode, a consonant relationship. While such reed dimensions can, of course, desirably be provided, such design limitation increases the cost of the reeds when the musical instrument comprises 88 tuned reeds to provide a pitch range of the piano. Therefore, it is preferable that the B vibration mode of the reed be eliminated from the translating apparatus. Normally, the striking hammer is designed to strike the reed normal to its flat side so that there is little or no vibration of the reed in the B mode. More importantly, a slight and undesirable B mode vibration of the reed is neutralized by the dual nature of my pick-up, as can be seen from figure 11 wherein a sidewise motion of the reed 16 produces no change in capacity between the reed and the pick-up as a whole. Obviously, an excessive B mode vibration of the reed may result in physical contact between the reed and one or the other of the pick-up ends thereby ruining the output tone. However, such condition does not arise in practice as the striking hammer and its operating mechanism can be designed for normal reed excitation in the A vibration mode and as the reed width is chosen to be several times its thickness thereby giving the reed a much higher stiffness in the B mode direction, this stiffness being proportional to the square of the width.

It will be noted the body portion of my pick-up lies in a plane normal to the reed axis whereby the mechanical coupling of the reed to the pick-up body is zero except for extremely large excursions of the reed. This is an important feature of the pick-up construction and orientation since the pick-up, loaded as it is by the pick-up ends, will have a natural, fundamental frequency well within the upper reaches of the reed scale of frequencies. Thus, with other than zero coupling the pickups, unless quite thick, could resonantly absorb some of the vibrational energy of the higher-pitched reeds and such pick-up vibration would also be translated through modulation of the reed to pick-up capacity. The relatively short and thick ends of the pick-up have a natural frequency lying beyond that of the highest pitched reed and, therefore, are not a disturbing factor. Similarly, the insulating, tubular bushings that support the pick-ups are individually loaded by the pick-up and clamping screw and have a natural frequency beyond the range of the highest pitched reed and, therefore, can do no harm.

From what has been described thus far it is clear that I have taken steps to eliminate or neutralize all unwanted vibrations of the individual parts and the assembly thereof. The lateral mode of vibration of the reed base varies from the bass end of the instrument (where the reed base is of maximum width) to the treble end (where the reed base is of minimum width) so that at any reed position the natural vibration frequency of such reed-base-vibration mode is 8 or more octaves above the reed frequency. If the natural vibration frequency of the bass end of the reed base is of the same order, relative to the proximate reeds, as that of the treble end of the bass the intervening distance of several feet (in the case of a piano) is sufficient to decouple such vibrations.

The reed base may have suitable longitudinal curvatures from one end (bass) to the other (treble) for the purpose of effecting a straight hammer-striking line along the entire complement of reeds to simplify the installation of the numerous hammers. Where a sturdy, that is, massive and stiff, cabinet is employed to house the assembly of reeds and pick-ups the reed base may be screwed securely to the top, bottom or side of such cabinet, depending upon the type of hammer action employed. This will further stiffen the reed base and increase its inertness against vibrational deformation and reed-energy losses. If, however, the cabinet is of relative thin construction easily subject to vibration by the reed base so that further vibrational losses occur in the cabinet itself, then it is preferable to float the entire reed assembly on a resilient, low-viscosity system of non-resonant springs, a foam rubber pad, or air-inflated, thin-walled balls, tubes or cushions.

I shall now present a more detailed description of my novel reed-clamping arrangement affording heretofore unattainable advantages.

When a beam type vibrator is provided with a termination device that forms a nodal point for all of the beams vibration partials, it is, generally, very important that such point be very definitely located and that there be no microscopic vibratory slippage of the vibrator within the confining boundaries of the clamp. These factors are especially important when such vibrator is used in a musical instrument requiring low output tone damping rates. If there be even a minute, longitudinal section of the reeds vibratory portion, within the clamping device, which is so insecurely clamped that there exists a longitudinal sliding friction between the reed and the clamp, such friction, even though minute for one cycle of reed vibration, will progressively damp out the vibratory energy of the reed. I have found that such sliding friction, within the confines of the reed clamp and immediately adjacent to vibratory portion of the reed's fixed end, accounts for a relatively large portion of the damping influences acting on the reed. These reed damping, or vibratory energy-dissipative resistive effects of such reeds may be segregated into the following classes:

(1) Internal, viscuous resistance in the vibrator itself,
(2) Resistive slippage losses in the vibrator clamp,
(3) Reflected losses of the clamp and clamps supports due to their own vibration,
(4) Air friction losses,
(5) Sound radiation losses.

Generally, influences 4 and 5, above, are small compared to the first three and can be minimized by use of reeds having a relatively narrow width or, where possible, round-section reeds.

Influence number 1, above, can best be minimized by a choice of the reed material for closest possible approach to the ideal of perfect elasticity as laid down in Hooke's law. A high grade of high carbon spring steel having a hardless of Rockwell C–50 has been found suitable for the reed material.

Influence number 3, above, is best minimized by use of relatively massive supports, for the reed clamps, of low viscosity materials such as, for example, cast iron or hard aluminum. A massive clamp support structure minimizes the amplitude of the clamp and support vibrations and so minimizes all vibration losses of the clamp and clamp supports.

Influence number 2, is best minimized by use of discrete, sharply-defined lines or points of clamping and the use of hard, non-deformable materials. As has been stated above, the resistive slippage losses strongly affect the damping rate of the vibrator. When such vibrator is intended for use with electronic translating and reproducing apparatus for the production of piano-like tones it is important that the vibrator have at least as low damping rates as those of piano tones. Obviously, resistive slippage losses, of the character under discussion, can be tolerated if the vibrators be of such large size that their damping rate is still low enough to provide piano-tone damping rates. I have found that, other factors being equal, the vibration time of a clamped-free reed, of a given fundamental frequency, varies about as the length of the reed, the reed thickness being correct to maintain the same frequency. It is believed that this is due chiefly to the fact that the longer, thicker reed can absorb more impulsively applied energy so that even though some of the reed energy is dissipated by various losses, the reed still has sufficient energy to provide a longer vibration time as compared to a shorter, thinner reed. An additional factor is believed to reside in the lower slippage factor between the reed and the clamp.

Fixed-free reeds, as used in various sustained-tone musical instruments, such as reed organs, accordions, harmonicas, and the like, do not require low vibration damping rates since their vibration losses are continuously supplied by vibration-exciting energy, usually air streams. The chief concern in such instruments is not tone damping rate but a second order factor of energy supply which is always more than adequate for sustaining reed vibrations. The chief, and traditional, example of the use of fixed-free reeds in a damped tone musical instrument is the music box in which the reed is excited mechanically by a clock-work-driven plucker device. Such "Swiss music boxes" have been known and developed over a period of some 150 years and, therefore, have reached a high state of mechanical and musical perfection within the limits of their capabilities. In these instruments, the reeds are made in the form of a comb with closely spaced teeth (reeds) of various lengths, such lengths being determined by the material used, the thickness of the tooth and its loading, to provide a musical scale of frequencies. Such reed combs are made of high quality steel and every effort is made to preserve, as long as possible, the fleeting nature of their tones, that is, to secure the lowest possible damping rates consistent with good output sound level. In such instruments the utmost effort is made to minimize their cost, yet the reed comb is an obviously expensive part of their total cost since the fixed end is of the order of five to ten times the thickness of the vibratory teeth. Such physical form must be obtained by mechanical removal of material, as by milling, grinding, or etc., to obtain a fixed end much thicker than the vibratory or reed end. This type of construction has been long standardized in this art as one which yields the minimum vibrational damping yet its obviously costly design remains after a research and development period of 150 years aimed largely at cost reduction. Had any simpler or less expensive method of terminating the reed ever been found it most assuredly would long since have been adopted.

In another art, namely, reed type frequency meters, the identical method for terminating the reed fixed end is utilized. In both arts, the reed comb is very securely affixed, as by soldering over a large area of the thick, reed-terminating end of the comb, to a relatively massive support. Such support is, in turn, rigidly anchored to a larger and more massive, non-vibratile support, usually made of cast iron, and the latter support is still further and securely mounted in a relatively massive housing or cabinet. All of these mounting precautions are designed to conserve, as long as possible, the vibrational energy of the reed vibrations in the case of a music box, while in frequency meters the same design is utilized to provide a maximum Q or sharpness of reed tuning. Both such end results are, in effect, the same.

I have referred to the music box and frequency meter arts to stress the fact that while much importance has long been placed on decreasing the damping rates of fixed-free vibrators the best results achieved over a period of 150 years have been obtained by using reeds whose fixed ends are much thicker than their vibratory ends. As will be described in detail hereinbelow, I have found a way to decrease the damping rate of a fixed-free reed beyond that heretofore possible while utilizing reeds having a constant cross-sectional area throughout the entire length of the reed. My construction, therefore, is not only suitable for use in the music box and frequency meter arts but makes it possible to use uniform, fixed-free reeds as tone generators in electronic musical instruments designed to duplicate the low-damping-rate tone characteristics of a tensioned string piano.

Reference is now made to Figure 16 wherein there is shown a longitudinal, sectional view of a reed R of length L and thickness T, said reed having an end termination in the clamp C and adapted for normal vibration in the plane of the paper as indicated by the arrows U, D. As the reed vibrates upwardly there is a tendency for its upper side to slip inwardly relative to the clamp C as indicated by the arrow I and for its lower surface to slip outwardly of the clamp as indicated by the arrow O. A reverse action takes place when the reed vibrates downwardly. The degree of this slippage is determined, for a given clamp pressure, by the ratio of the reed length to ½ the reed thickness, or, $$\frac{2L}{T}$$

the factor ½T being the short lever arm effective to cause the reed slippage. If the reed be 4 inches long by .032 inch thick then the relative force effective to cause reed slippage is $$\frac{2\times 4}{.032}=250$$

so that any given displacing force applied to the free end of the reed is multiplied by a factor of 250 to produce reed slippage within the clamp. Thus, if the reed be made thicker, for a given length, this slippage factor is reduced. Since the frequency of a reed is directly proportional to its thickness and inversely proportional to the square of its length, the thickness factor increases at a greater rate than the length factor for reeds of the same frequency. Thus, longer, thicker reeds of the same frequency have lower damping rates—the reason for this lying in the reduced, effective slippage—producing forces. This also explains why reeds having a vibratory section of given thickness and length, but with a larger terminating thickness will show a lower damping rate. This statement will become more apparent by reference to Figure 17 which is similar to Figure 16. The vibratory sections of the reeds shown in these two figures are of equal thickness and length. However, the fixed or lug end of the Figure 17 reed is substantially thicker and, therefore, the factor $$\frac{T}{2}$$

is greater, resulting in a reduced slippage force.

Another objectionable effect of insecure clamping of the reed is a change of reed frequency with amplitude. This factor is shown, in exaggerated scale, in Figure 18. If the edges of the clamp C adjacent to the vibratory portion of the reed R do not clamp the reed securely the effective, vibratory length of the reed changes from L at low vibration amplitude to L' at high vibration amplitude. Since L' is shorter than L the reed frequency increases as the amplitude of vibration increases.

For reasons both of reducing the clamp slippage losses and for preventing frequency shift, the reed clamp must itself be rigid, the clamp must secure the reed positively, and there must exist a very definite, fixed line of demarcation between the clamped and vibratory portions of the reed. Clamping a reed between the jaws of a massive vise, or the like, only fortuitously yields the desired security. Even if initially secure, the continual vibration of the reed will soon deform the edges of the clamping jaws as shown in the exaggerated representation of Figure 18. If such parallel, reed-clamping jaws be made of very hard material and if the jaw edges be exactly parallel the effect under discussion would, of course, be minimized. However, to provide a clamping device of this type wherein the edges of the opposed jaws are exactly opposite each other, with no overlap on one side of the reed, is difficult of practical attainment. As shown in Figure 19, any overlapping of the edges E, E, of the jaws J, J, of the clamping device alters the effective length of the reed's vibratory portion at different amplitudes of vibration.

My solution to the reed-clamping problem is simple and effective. Reference is made to Figure 20 which is a central sectional view taken through a reed 40 and a reed rail (or base) 41. The reed is clamped between hardened steel screws 42, 42', each screw having a slightly concave reed-contacting end provided with one or more circumferential ridges 43, 44 and 43', 44'. The two screws are mounted in a common, close-fitting, threaded hole passing through the reed rail and are provided with relatively fine threads whereby the opposed circumferential ridges of the two screws fall into precise alinement. These screws are made of hard material having an actual hardness greater than that of the reed. Thus, the screw ridges indent the reed and provide a good, firm reed anchorage. If the screw ridges have a depth of say, 0.001 inch, the grooves between the ridges will become filled with reed material as the screws are tightened and the ridges indent into the reed surface as shown in Figure 20-a. Thus, the screw pressure is distributed throughout most of the groove area. Nevertheless, the maximum pressure will exist at the tips of the ridges. Since the inner edges 45, 45' of the screws are tapered toward the outer ridge, essentially a line contact is defined between the vibratory portion of the reed and its own clamping means. The base 41 forms no direct part of the reed clamp, said base being provided with a transverse hole 46 that clears all sides of the reed. This transverse hole has a diameter such that the reed cannot touch the reed base for maximum excursions of the reed in normal vibration. A front view of the reed-clamping screw 42 is shown in Figure 21. The reed is easily alined, axially, in the clearance hole 46 during assembly by first positioning the reed counter-clockwise against the opposed front and rear walls of the hole in the plane of the set screw end, holding the reed in such position as the set screw is partially tightened. During the final fractional turn of the set screw tightening operation, the reed is allowed to turn clockwise with the set screw until the reeds own axis lies along the axis of the clearance hole 46. This is a simple manual operation quickly learned by an assembly worker, especially with the use of a torque measuring, set screw wrench.

A reed-clamping arrangement of the type just described is shown in the sectional view of Figure 4 except that in the latter case the reed-contacting ends of the clamping screws are each provided with a single, circumferential ridge. The actual number of such circumferential ridges is a matter of design choice, a plurality of ridges being preferred for use with relatively large reeds.

A modification of my reed-clamping arrangement is shown in Figure 22 which is a sectional view similar to that of Figure 20. Here contact with the opposite surfaces of the reed 40 is made by a pair of plugs 50, 50', each such plug having a concave end resulting in a circumferential ridge, the ridges being identified by the numerals 51, 51'. The lower plug 50' is force-driven into the hole running through the reed base 41. Alternatively, this plug can be soldered or welded into fixed position, the important consideration being that the plug will not move, axially of the hole, under the force applied for reed-clamping purposes by the screw 52. The upper plug 50 is slidable within the hole and is forced into contact with the reed by turning the screw 52. Both of these plugs are made of hard material each provided with a single circumferential ridge. One advantage of the plug type reed clamping arrangement lies in the fact that forces generated during the reed-clamping operation are always applied normal to the reed surface eliminating any reed-tearing action.

When the reed-clamping members are provided with circumferential, or arcuate, ridges, the line of demarcation between the reeds vibratory and clamped portions is arcuate. In some instances it is preferable that such demarcation line be straight and substantially transverse to the reed axis. This can be accomplished, in the plug arrangement, by providing the reed-engaging ends of the plugs with parallel ridges. Figure 23 is a front view of a plug 50a provided with a plurality of parallel ridges 53.

Another type of reed-clamping arrangement, employing the same principles, is shown in Figure 24 which is a sectional view similar to those shown in Figures 20 and 22. Here the reed clamp comprises a lug 54 having a parallel-walled slot 55 terminating in an enlarged transverse hole 56. The lower surface of the lug is provided with a number of integral teeth 57 at the front and rear ends, such teeth being sharp-pointed and about 0.010 inch deep. When the reed 40 is inserted between the clamping jaws J, J of the lug and the clamping screw 58 is tightened into the threaded hole in the reed base 59, the normally-parallel walls of the slot 55 are angled toward each other so that their outer edges J, J, first contact and clamp the reed. Such initial, line contact with the reed arises by reason of the fact that the transverse hole 56 in the lug has a diameter greater than the width of the slot 55. As the screw pressure is increased, the jaw members bend toward each other, between the outer ends J, J and the hole 56, so that more and more of the lug comes into contact with the reed. However, the outer edges of the jaws J, J, always retain the highest clamping pressure on the reed, effectively maintaining a sharply-defined line of demarcation between the vibratory and fixed end of the reed. The teeth on the bottom surface of the lug insure a non-slipping and non-vibratile connection between the lug and reed base. As shown in Figure 25, which is a front view of the assembly shown in Figure 24, the width of the lug 54 is greater than the width of the reed 40 to assure uniform clamping of the reed. The reed rail 59 has a length sufficient to accommodate the entire series of reeds and reed clamps.

My novel types of reed-clamping arrangements are so effective in eliminating and/or reducing those factors tending to damp reed vibrations that I am able to use ordinary, small reeds, made of spring-steel strip, having a uniform thickness and width throughout the entire reed. By actual tests, a flat strip, uniform reed, clamped as herein disclosed, has a damping rate at least 25% lower than similar uniform reeds clamped in any present manner or reeds having thick, integral lug sections. This constitutes a most important advance in the electronic musical art as it reduces the cost of the reeds and makes it possible to use such reeds to produce tones having damping rates comparable to those of tensioned-strings. Since the novel clamp reduces the reeds damping it also increases the oscillatory Q of the reed which expresses the ratio of the mechanical reactance to resistance. When clamped mechanical vibrators are used in frequency-selecting devices, as in frequency meters, tuned mechanical filters, etc., or as vibration-producing elements, as in narrow band generators, it is important that they have the lowest possible damping rate, or the highest Q. My clamping device, therefore, has numerous applications in the general field of sharply-tuned mechanical vibrators.

Having now described an assembly that includes reed-clamping devices, pick-ups and a reed-pick-up base, all of novel construction I shall now proceed to describe novel arrangements for the selective adjustment of the individual damping rates of a bank of reeds and means for selectively altering the adjusted damping rates of all such reeds. The former adjustment is essential to provide an electronic instrument having tone-damping rates comparable to those of a conventional instrument as, for example, a tensioned-string piano wherein the individual strings have a smoothly, progressively-varying damping rate. The latter adjustment is essential to provide, in a single instrument, output tones having damping rates corresponding to different instruments such as the harp, banjo, drums, etc. I accomplish these results by utilizing flat, very compliant damping devices, attached to a suitable support and adapted to contact the side edges of the reeds. Various other very yieldable materials may be used, such as, for example, very thin tough metallic leaf springs.

Reference is now made to Figure 26 which is a fragmentary, isometric view, with certain parts shown diagrammatically, of an assembly similar to that shown in Figures 2–4 but including a mechanical reed-vibration-damping arrangement. The entire complement of reeds, two such reeds 60, 61 being shown in the drawing, is secured to the unitary, cast metal base 62 between clamping screws, two such screws 63, 64 being shown. Also shown are two pick-ups 65, 66 supported in proper position by the associated bushings 67, 68 and fastening screws 69, 70, respectively. Associated with each reed is a mechanical vibration damper in the form of a thin metallic leaf spring 71, such springs being secured to a rail 72 in an adjustable manner as shown in Figure 27 which is a fragmentary, cross-sectional view taken through the rail 72 and one reed-damper device. Specifically, the leaf spring 71, made of hard, chrome-plated steel having a thickness of the order of a few thousandths of an inch, has a clearance hole accommodating the screw 73. The inner end of the leaf spring is bent sharply and disposed within a transverse slot 74 in the rail 72, said slot having a width substantially equal to the spring thickness (see the front view shown in Figure 28). It will be apparent that such design prevents rotational movement of the leaf spring and that the actual pressure of the downwardly-biased leaf spring against the side edge of the reed 60 can be adjusted by means of the screw 73.

Referring again to Figure 26, each leaf spring 71 contacts its associated reed near the reed's fixed end and the surface of contact with the reed is normally parallel to the side of the reed. Specifically, the surface of the leaf spring adapted to contact the side of the reed is parallel to the A vibration mode of the reed. The normal, small, continuous pressure exerted against each reed by its leaf spring may be adjusted, individually, to obtain a smooth variation of the damping rates from low to high pitched reeds, as in a piano. From a practical standpoint, irregularities in the damping rates of the individual reeds may exist due to the different individual self-damping rates or to different base-reflected damping rates. By individually adjusting the initial pressure of each leaf spring against the associated reed, the damping rate of the entire scale of reeds may be "voiced" or normalized. Such reeds whose self-damping is increased by the coupled and reflected losses in the reed base and its attachments, may produce output tones of higher damping rates than other reeds reasonably adjacent thereto. The lower damped reeds must, therefore, be damped mechanically to bring them into line with the other, higher-damped reeds to obtain a smooth progression of damping rates from bass to treble reeds. Inasmuch as flat reeds clamped by my novel clamping means have a lower damping rate than has heretofore been attainable, the "voiced-out" or normalized damping rates of a given series of reeds in a particular instrument still make it possible to provide an electronic instrument having damped output tones such as are characteristic of a conventional, tensioned-string piano, it being known that conventional piano tones have very low damping rates compared to other percussion instruments.

Having provided a simple, mechanical damping arrangement for normalizing the damping rates of a full complement of reeds, I then provide a simple arrangement for selectively altering such damping rates, in unison, to alter the entire complexion or character of all of the instruments output tones. This is accomplished by mounting the rail 72 on the base 62 so that the rail can be moved, axially, as diagrammatically shown by a pivoted foot pedal 75 that is mechanically-coupled to the rail by a flexible member 76 passing over a pulley 77. When the rail is in its normal position, as determined by the spring 78 which biases the rail against a suitable stop, the damping rate of each reed is determined by the pressure applied against each reed by the leaf springs, as explained hereinabove. With the foot pedal pivoted at the point P, depression of the foot pedal will move the rail 72 to the left. If now, the amount of pedal depression be controlled, the amount of additional pressure applied to all reeds by the associated leaf springs can be controlled. One convenient means for selectively applying predetermined incremental pressure increases to the reeds comprises a fixed member 80 provided with a series of notches 81, 82, 83. With the pedal 75 in the position shown, the reeds are subject only to the initial damping pressure as determined by the individual leaf spring adjustments. If now, the pedal be depressed and engaged in the notch 81, the damping rate of all reeds will be increased. Step-by-step, predetermined increases in the damping rates of all reeds become effective upon larger pedal depressions and engagements by the notches 82, 83. It will be apparent such arrangements make it possible for the performer to alter the character of the instruments output tones to provide tonal qualities of instruments such as the harpsichord, harp, banjo, etc. Obviously, a rotatable knob with a suitable indexing mechanism can be employed in place of the foot pedal.

Since the mechanical dampers, just described, are applied to the side of the reed they exert no elastic force in the direction of normal reed vibration and, therefore, they do not alter the vibration frequency of the reed.

Modifications of the reed dampers are shown in Figures 29 to 31. In Figure 29 the reed-contacting member comprises a thin metal leaf spring 71' formed in a reverse bend for greater, effective resiliency. Actually, the member 71' can be made of thin plastic, rubber, felt or hard rubber, the primary requirements being high yieldability and resistance to abrading with continued reed rubbing action. The insulator type of materials are preferred as they do not cause sudden click-producing disturbances in the electro-capacity field between the reed and the pick-up. In the Figure 30 modification the flexible member 85 is metallic and has cemented thereto a reed-contacting strip 86 of felt, leather, or etc. The damper member shown in Figure 31 comprises the metallic member 85 carrying the felt and a rubber strip 87 whose outer surface is covered with a thin, wear-resistant, metallic foil 88.

While I have discussed variation of the damping rates of all the reeds by varying the pressure exerted against the side of the reed, it will be apparent a similar result may be obtained by maintaining a fixed and low pressure on the reeds and sliding the mechanical dampers toward the free end of the reed where the reed vibration amplitude and velocity is larger. In such case the rail 72 is attached to the base 62 in such manner that depression of the foot pedal moves the rail in the direction of the free ends of the reeds.

It will be noted that by mounting the damper-supporting rail 72 above the reeds the lower surface of the reeds is open to the reed excitation device. Any reed-excitation device or mechanism can be employed, including a tip end plucking device controlled by a keyboard key.

In a conventional, tensioned-string piano, the string vibrations are terminated upon release of the hammer-actuating key unless the "loud" pedal is depressed in which case the strings vibrate for a period of time depending upon their individual damping rates. A similar effect can be provided in my electronic, vibratory reed instrument by providing a separate set of key or hammer-controlled dampers, as disclosed in my application Serial No. 169,714, or by applying a separate set of dampers carried by a movable rail (as herein disclosed), all dampers normally silencing the reeds but removable from contact with the reeds by the key or hammer action.

Where a keyboard-controlled hammer type of reed-excitation action is not desired, for reasons of expense, complexity or otherwise, the reeds may be excited by plucking with the fingers. In such case the reeds are best set in two horizontal rows, separated by one to three inches, with the one row comprising the natural tones and the other row comprising the chromatic tones. In such arrangement the relative disposition of the white and black key-board of a piano is preserved.

Reference is now made to Figures 32 and 33, (Figure 32 being a fragmentary, front view and Figure 33 being a sectional view taken along the line A—A of Figure 32) showing an assembly adapted for actuation of the vibratory reeds by finger plucking. The operative components of the device are supported by a back 90 that is firmly secured to a base 91, as by screws 92, said back and base being made of wood. Here the reed base 93 has sloping side walls terminating in a flat portion abutting against the back 90, such base comprising, preferably, a single metal casting secured to the back by screws 94. The tuned vibratory reeds 95, 96, 97, 98, 99 are secured to the reed base 93 by cooperating set screws 100, 101 of the type already described, the reed base being provided with recesses permitting access to the inner set screws 100, as shown. Individual, dual acting pick-ups 95' to 99', of the type shown in Figure 6, are associated with each reed, the pick-ups being supported from the front of the reed base 93 by the posts 102 and coacting screws 103.

The upper row of reeds, 98, 99, are those producing chromatic tones (such as the black key notes of a piano), whereas the lower row of reeds 95, 96, 97, produce the natural tones (such as the white key notes of a piano). If desired, such black and white key designations for the reeds may be painted on the top 105 and front 106 of the case and as indicated by the letters B and W on the drawings. Alternatively, the free ends of the reeds may be painted accordingly. In order to provide a more pleasing appearance of the instrument as a whole a covering member 107 is disposed over, and secured to, the reed base 93, as shown. The sloping side walls of such cover member are covered by strips 108 of resilient material, such as felt. Similar felt strips 109, 110 are cemented to the reed-proximate surfaces of the top 105 and front 106, respectively. These felt strips prevent over-plucking damage to the reeds.

It will be noted that the reeds are inclined with respect to the base 91 at an angle of approximately 30 degrees. Thus, when the instrument is placed upon a table top the forearms of the performer may be rested on the table top with the hands and fingers upraised to deflect the free ends of the reeds in a downward direction. With the reed tips extending beyond the outer surfaces of the case top 105, case front 106 and the covering member 107, finger-plucking of the reeds can be accomplished with ease and facility by anyone familiar with conventional piano-playing technique. In fact a practice instrument of this type can be provided by substituting markings of the actual notes, (such as C, C#, D, etc.) in place of, or in addition to, the B and W markings shown in Figure 32.

While an instrument of the type shown in Figures 32, 33 can be made much shorter than the keyboard length of a conventional piano for the same pitch range, I prefer to so space the reeds that finger plucking thereof requires substantially the same finger spread as does a piano keyboard. The playing operation, then, will be much like that of a piano except that the horizontally-held fingers pluck the reeds upward or downward instead of striking horizontal keys. Reed spacings for chordal playing are also comparable to those of the piano keyboard. Full touch-responsive control of individual output tone amplitudes is here realized. Over-plucking of the reeds, which might damage them, is prevented by the felt strips. The reed vibrations can be hand-damped as is done in a string harp or guitar, or automatic reed damping may be provided as described below.

Reference is now made to Figure 34 which is similar, in a general way, to the Figure 33 illustration. In Figure 34 some of the parts are shown in elevation and the device as a whole is modified to include selectively-controlled vibration dampers for the reeds. Again, the instrument cabinet comprises a base 120, a back 121, a top 122, a center member 123 and a front 124, such parts being made of wood. Separate, identical reed bases 125, 125' are provided for each row of reeds 126, 126' so that a downward plucking of the reeds will move the reeds away from their associated pick-ups 127, 127'. The reed-dampers comprise spring arms 128, 128' having an end secured to the associated reed base, as shown, each arm having secured thereto a thin leaf spring 129, 129'. When the arms 128, 128' are in their normal position the leaf springs bear against the side edge of the associated reed thereby providing a normal predetermined tone-terminating, reed damping influence. The free ends of the spring arms extend slightly beyond the reed ends so that when the plucking finger of the performer moves downwardly across and in contact with the reed tip it will also engage the end of the spring arm in a continuous motion. Upon removal of the finger from contact with the reed and spring arm the reed vibrates and the spring arm returns to the position shown in Figure 34 wherein the rigid stops 131, 131', secured to the respective arms 128, 128', abut against the felt strips 132, 132' cemented to the reed bases 125, 125', respectively. In such position of the spring arms, the leaf springs contact the side of the reeds thereby terminating reed vibration at a rate depending upon the pressure and contact area between the reed and the leaf spring.

Reference is now made to the enlarged fragmentary, isometric view of Figure 35 which shows a reed 126, spring arm 128 and the leaf spring 129 in the normal, at rest position. To excite the reed the performer deflects the free end of the reed downward and releases it quickly. If only the reed is so initially deflected the damping rate will be relatively high as the reed rubs against the leaf spring 129 immediately upon release of the reed by the finger. If, however, the reed tip and the cross arm 135, of the spring arm 128, are both deflected downwardly and simultaneously released, the reed will have a somewhat longer vibration time as the leaf spring 129 is moved out of contact with the reed at the moment of reed release. Such separation of the leaf spring 129 from the reed takes place upon downward depression of the spring arm 128 by reason of the inclined surface 136 of the triangular post 137 (see also Figure 34). As the end of the spring arm 128 is depressed downwardly by the finger the offset end 138 of the arm slides along the inclined surface 136 resulting in a movement of the spring arm to the right. Even a slight such transverse movement of the spring arm separates the leaf spring 129 from the reed and the actual gap established between the leaf spring and the reed depends upon the extent to which the performer depresses the end 135 of the spring arm prior to release of the reed. If now, the performer releases the reed and spring arm simultaneously the reed will have an unrestricted vibration until such time as the leaf spring 129 returns to its normal, reed-contacting position, after which the reed damping rate is increased. It will be clear that the performer may release the reed while still maintaining the spring arm depressed to thereby produce a longer reed vibration time. In the event the performer wishes to maintain several reeds in unrestricted vibration while plucking other reeds, as in chordal playing, the end 138, of the spring arm, may be depressed into contact with the resilient pad 130 and moved into engaging position within the notch 140 provided in the post 137. The depth of the notch 140 is such that with the spring arm end 138 disposed therein, the spring arm is retained in a position to the right of its normal position whereby the leaf spring 129 remains spaced from the side of the reed. All such engaged spring arms can be freed from the associated notches by merely running the finger along the front 123 of the instrument in a swift, continuous, spring arm-unlatching manner. The disclosed arrangement, then, makes it possible for the performer to apply a variety of different damping rates to one or more reeds all of which produces tone-character changes in the output tones of the instrument. While I have shown the spring arm, carrying the mechanical reed-damper, laterally displaced from a vertical plane passing through the longitudinal reed axis, it will be apparent the spring arm may comprise a straight member so attached to the reed base that it lies directly under the reed. In such design the normal position of the spring arm must lie beyond the maximum amplitude vibration range of the reed.

While I have shown a simple, leaf spring mechanical damper associated with each vibratory reed in the device shown in Figures 34 and 35, it will be understood such damper can be made in any of the forms shown in Figures 27–31, inclusive.

Referring back now, the instrument assembly shown in Figures 2–4, inclusive, is designed primarily for hammer excitation of the reeds such hammers being key-board controlled as in a conventional piano. Such playing-key hammer mechanisms are well known and, since they form no part of my present invention, there is no need for a detailed showing thereof in this application. On the other hand, the instruments shown in Figures 32–34 inclusive, are designed primarily for finger-plucking excitation of the reeds and the reed scale is divided into two rows, one row comprising natural pitch reeds and the other comprising the chromatic pitch reeds, thereby presenting a playing technique related to the finger action on a piano key-board. I shall now describe another instrument employing the same principles and novel features of my invention but designed for hand-held, mallet excitation of the reeds as in the playing of an xylophone, marimba, cembalo, etc.

Reference is now made to Figure 36 which, essentially, is a side view of such instrument with one half shown in transverse, cross-section for purposes of description. Here the reed base 150 is a unitary, cast-metal or other member, having opposed, sloping sides, and supported upon an elastic pad 151 of foam rubber or the like. The pad is cemented to the base 150 and to the wood base 152, the latter forming the bottom of the instrument cabinet that includes the two sides 153, 155 and the two tops 154, 156, such cabinet members being secured together by wood screws; as shown. The reed complement is again divided into two rows, one such row comprising the natural-pitched reeds, as the reed 157, and the other row comprising the chromatic pitch reeds, as the reed 158. All reeds are individually secured to the upright portion of the reed base 150 by cooperating set screws 159, 160, of the type already described, the upper screws 159 being accessible from the top surface of the base 150 and the lower screws being accessible through the holes 161 provided in the reed base. The reeds are all properly clamped to the reed base prior to the attachment of the pad 151 and prior to the attachment of the wood center piece 162 to the top of the reed base by means of suitable screws. Operatively associated with each reed is my novel dual-type pick-up 164 each such pick-up being secured to the reed base by the insulator bushings 165 and fastening screws 166. The cabinet tops 154, 156, extend over the free ends of the proximate reeds whereby the reeds may be struck by the felt-covered head of a mallet 168, at a point about ¼ of the reed length from its fixed end. Obviously, the illustrated arrangement is adapted for use with keyboard controlled hammers as well as with various plucking and electro-magnetic devices. Also, this particular instrument may be provided with mechanical reed-vibration dampers selectively adjustable and variable, as has been described with reference to Figure 26, for the control of reed damping rates. In a simple instrument of this type intended for economical manufacture, the reed base 150 can be made of insulating material, such as laminated hard-wood, molded plastic, etc., in which case the pick-ups can be fastened directly to the base, there being no need for the insulator posts 165.

Having now described the numerous novel features of my invention and various structural embodiments incorporating such features, as well as several novel instrument assemblies, numerous other variations and modifications of the individual components and their interrelated assembly will suggest themselves to those skilled in this art. Such variations and modifications can be made without departing from the spirit and scope of the invention as set forth in the following claims.

I claim:
1. A clamping arrangement for the end portion of a flat vibratable reed, comprising two axially aligned generally cylindrical rigid clamping members each contacting a respective one of the two faces of said end portion along a narrow circularly formed line, said lines of contact of the respective said members being aligned with each other transversely of said end portion.

2. A clamping arrangement according to claim 1, wherein the clamping members are screws having concave end surfaces resulting in said narrow circularly formed lines of contact.

3. In an electrical musical instrument, the combination of a fixed-free reed impulsively excitable into vibration in a path normal to the plane defined by the free periphery of the reed, and a vibration-decrement-increasing element associated with and effective on said reed throughout its vibration, said element being lightly biased into contact with a portion of the free periphery of the reed and having a hard surface along which the reed periphery slides oscillatorily as the reed vibrates.

4. An electrical musical instrument as defined in claim 3, wherein manually operable means is provided for adjusting the pressure contact of said element into engagement with the reed.

5. In an electrical musical instrument, the combination of a plurality of fixed-free reeds impulsively excitable into vibration in a path normal to the plane defined by the free periphery of the reeds, and a vibration-decrement-increasing element associated with and effective on each said reed throughout its vibration, each said element being lightly biased into contact with a portion of the free periphery of its associated reed and having a hard surface along which the reed periphery slides oscillatorily as the reed vibrates, and means for simultaneously adjusting the pressure contact of said elements against the reeds.

References Cited in the file of this patent

UNITED STATES PATENTS

| | | |
|---|---|---|
| 596,906 | McPherson | Jan. 4, 1898 |
| 1,109,177 | Noble | Aug. 11, 1914 |
| 1,166,951 | Kramer et al. | Jan. 4, 1916 |
| 1,247,356 | Wooden | Nov. 20, 1917 |
| 1,915,858 | Miessner | June 27, 1933 |
| 1,929,027 | Miessner | Oct. 3, 1933 |
| 1,992,317 | Loar | Feb. 26, 1935 |
| 2,085,760 | Loar | July 6, 1937 |
| 2,180,122 | Severy | Nov. 14, 1939 |
| 2,192,216 | Woodruff | Mar. 5, 1940 |
| 2,510,094 | Fleury | June 6, 1950 |
| 2,532,039 | Sebouh | Nov. 28, 1950 |
| 2,542,611 | Zuck | Feb. 20, 1951 |
| 2,620,702 | West | Dec. 9, 1952 |
| 2,634,649 | Nemeth | Apr. 14, 1953 |

FOREIGN PATENTS

| | | |
|---|---|---|
| D. 461,406 | Italy | Jan. 26, 1951 |
| 232,314 | Germany | Mar. 13, 1911 |
| 40,857 | Sweden | Feb. 28, 1914 |
| 405,278 | Great Britain | Jan. 29, 1934 |